United States Patent [19]
Nakase et al.

[11] Patent Number: 5,742,361
[45] Date of Patent: Apr. 21, 1998

[54] DATA DEMULTIPLEXER

[75] Inventors: Junko Nakase, Kokubunji; Yukio Fujii, Yokohama; Hiroshi Gunji, Tokyo; Katsumi Matsuno, Kokubunji, all of Japan

[73] Assignee: Hitachi, Ltd., Tokyo, Japan

[21] Appl. No.: 753,761

[22] Filed: Nov. 29, 1996

[30]     Foreign Application Priority Data

Nov. 30, 1995  [JP]  Japan .................................. 7-312026
Mar. 15, 1996  [WO]  WIPO ....................... PCT/JP96/00676

[51] Int. Cl.⁶ ................................................... H04N 7/24
[52] U.S. Cl. .......................... 348/845; 348/423; 370/465
[58] Field of Search .............................. 348/845, 423; 670/465; H04N 7/24

[56]           References Cited

U.S. PATENT DOCUMENTS

| | | | |
|---|---|---|---|
| 5,583,562 | 12/1996 | Birch | 348/423 |
| 5,596,369 | 1/1997 | Chau | 348/423 |
| 5,598,352 | 1/1997 | Rosenau | 348/423 |
| 5,606,370 | 2/1997 | Moon | 348/423 |
| 5,617,145 | 4/1997 | Huang | 348/423 |
| 5,623,314 | 4/1997 | Retter | 348/423 |
| 5,661,655 | 8/1997 | Glass | 348/423 |

FOREIGN PATENT DOCUMENTS

| | | |
|---|---|---|
| A-5-236009 | of 0000 | Japan . |
| A-62-193336 | of 0000 | Japan . |
| A-8-32622 | of 0000 | Japan . |
| A-8-51623 | of 0000 | Japan . |
| A-8-97837 | of 0000 | Japan . |

OTHER PUBLICATIONS

ISO/IEC, "Information Technology–Generic Coding of Moving Pictures and Associated Audio: SYSTEMS", ISO/IEC 13818-1 International Standard 1994 Nov. pp. 10–19.

Primary Examiner—Howard W. Britton
Attorney, Agent, or Firm—Antonelli, Terry, Stout, & Kraus, LLP

[57]           ABSTRACT

A data demultiplexer includes a write controller, a memory, an analyzing processing unit, and transfer control units. The write controller writes packets which have arrived thereat into the memory in the order of arrival and sends the write information to the analyzing processing unit. The analyzing processing unit analyzes packets in the order of arrival on the basis of the write information and sends only the result of analysis to the transfer control units. On the basis of the result of analysis, the transfer control units send data read from the memory in the order of packet arrival to the decoder. A data demultiplexer capable of reducing the processing in the analyzing processing unit can be provided.

12 Claims, 11 Drawing Sheets

DATA DEMULTIPLEXER

BACKGROUND OF THE INVENTION

1. Field of the Invention

The present invention relates to data demultiplexers, and in particular to apparatuses for separating a stream containing multiplexed data such as video data and audio data having high bit rates into a video stream and an audio stream and transferring them to a video decoder and an audio decoder.

2. Description of the Related Art

Recently, applications of recording/reproducing digital video data or digital audio data onto/from a storage medium and sending/receiving them via communication lines are increasing. Typically in such applications, each of video data and audio data is partitioned into units called packets at the time of recording or sending, and a plurality of such packets are multiplexed to form a multiplexed stream. Hereafter, an apparatus for extracting each of desired video data and audio data from such a multiplexed stream and transferring the extracted data respectively to a video decoder and an audio decoder at proper timing is called multiplexed stream demultiplexer.

With the spread of such application of transmitting or recording digitized video data and audio data, a technique for multiplexing a plurality of video data and audio data is needed on the recording/sending side.

On the reproducing side, it is demanded to separate desired video and audio data from these multiplexed data and send them to a video decoder and an audio decoder. Such an apparatus is called multiplexed stream demultiplexer.

As one of standards for multiplexing such a plurality of video and audio data, the MPEG (Moving Pictures Expert Group) system standard can be mentioned. (As for details, see ISO/IEC, "Information Technology—Generic Coding of Moving Pictures and Associated Audio: Systems", ISO/IEC 13818-1 International Standard, November 1994 pp. 10–19.)

The MPEG is the international standard relating to coding of digital video/audio signals and multiplexing thereof. Its portion relating to multiplexing is called MPEG system standard. Hereafter, description will be given on the basis of the form of a stream called transport stream (hereafter also referred to as TS) included in the system standard of MPEG 2.

The transport stream TS is a stream form allowing multiplexing of a plurality of programs on one stream and it is used mostly in broadcast applications. The transport stream TS contains continuous packets each having a fixed length of 188 bytes. Each packet contains coded video or audio data and information relating to the stream. A header is disposed at the top of each packet. By checking up a field for packet identification called PID (Packet Identifier) and included in this header, it is possible to know the kind of the packet.

The procedure for separating the video and audio data of a desired program from the transport stream TS will now be described briefly.

First of all, information relating to the stream and called PSI (Program Specific Information) is contained in the transport stream TS besides video and audio data as described before. By analyzing the PSI, the values of the PID (Packet Identifier) associated with packets containing video and audio data of each program can be known. The PSI (Program Specific Information) has a two-stage configuration, i.e. a PAT (Program Association Table) and a PMT (Program Map Table). First of all, the PAT packet is analyzed to derive the PID (Packet Identifier) of the PMT (Program Map Table) corresponding to a desired program number and then the PMT packet is analyzed to derive the PIDs (Packet Identifiers) of the packets containing the video and audio data of the desired program. Upon deriving the values of the PID (Packet Identifier) of the video and audio packets, the video data and the audio data are taken out from the pertinent packets and transferred to respective decoders.

FIG. 5 shows an example of configuration of a multiplexed stream demultiplexer based upon the above described MPEG system standard. The transmitted TS data 101 is separated into a video packet, an audio packet and a PSI packet by a demultiplexer 402.

The PSI packet is sent to a PSI analyzing unit 404 via a buffer 403 and subjected to the PAT and PMT analysis. The video packets and the audio packets are sent from the demultiplexer 402 to respective buffers 403 and sent to the video decoder and audio decoder (108, 109) successively. Since headers of the transport stream TS must be removed before the packets are sent to the video decoder and the audio decoder, however, it is necessary to skip headers when writing/reading the buffers 403.

Hereafter, the transport stream TS which is an input stream will be further described. The transport stream TS is a stream including multiplexed transport packets each having a fixed length of 188 bytes. At the head of each packet, a header having 4 bytes at a minimum is disposed. After the header, there is a data store portion called payload. Four bytes located at the top of the header are partitioned into 8 fields. The length of each field is 1 bit at a minimum and 13 bits at a maximum. This includes a synchronization pattern of 8 bits and a packet identification field of 13 bits called PID.

When demultiplexing the transport stream TS, it is necessary to check up the values of these packet identification fields and to branch the processing for the packets according to the values. In other words, it is possible to know what the packet is by seeing the PID (Packet Identifier). In some cases, the header portion stretches for more than 4 bytes at the top. In that case, it is necessary to further check up the values for a plurality of fields and to branch the processing according to the values.

In the payload of the video and audio packets included in the above described packets, a stream obtained by compressing video and audio data with coding is housed in the form of PES (Packetized Elementary Stream). FIG. 2 shows the relation between the PES and the transport stream TS.

The PES (Packetized Elementary Stream) is obtained by partitioning the video/audio stream with suitable lengths and adding a PES header at the top of each partition. In the PES header, a time stamp which is time information for aligning timing of decoding and displaying of video or audio data is included. In other words, the PES data is housed divisionally in payloads of a plurality of packets of the transport stream TS as shown in FIG. 2. FIG. 2 shows the case where one transport stream TS is created from one PES. In the case where one transport stream TS is to be created from two PESs, i.e., one video PES and one audio PES, each PES is divided into payloads of a plurality of packets of the transport stream TS independently and then those packets are multiplexed. In this case, the created transport stream TS contains a mixture of video packets and audio packets.

The procedure for decoding video and audio data of a desired program from the transport stream TS will now be described. First of all, the packet identification information PIDs of packets housing the video and audio data of the desired program are derived. Then payloads of the packets having those PIDs are extracted and sent to the video decoder and the audio decoder, respectively. In the video decoder and the audio decoder, inputted encoded data are expanded and outputted.

In the transport stream TS, a table called PSI (Program Specific Information) is prepared to supply, in response to a selected program number, PIDs of the video and audio packets forming that program. In other words, unless what in the transport stream TS is the video data of the program 1 and what is the audio data of the program 2 are found, they cannot be taken out to the decoder. Therefore, a table called PSI for supplying, in response to a certain program number, PIDs of packets respectively housing the video data and the audio data forming that program is prepared in the transport stream TS as heretofore described.

In other words, the table called PSI is formed by two-stage tables: the PAT (Program Association Table) and the PMT (Program Map Table) as described above.

First of all, the PAT (Program Association Table) is a table for supplying, in response to a certain program number, the PID of a packet of the PMT of that program. The PAT is a packet having all—"0" (hereafter referred to simply as 0) PID. In the payload of this PAT packet, the PID of the packet of the PMT is stored beforehand.

The PMT is a table supplying PIDs of the video and audio packets forming a program for each program number.

The procedure for deriving PIDs of the video and audio data by using the PAT and PMT has the following two steps. At the first step, the payload of the packet of the PAT with PID=0 is analyzed to derive the PID of the PMT. At the next step, the packet of the PMT is analyzed to derive the PID of the video and audio data.

When reproducing the desired program at a receiver apparatus receiving the transport stream TS, program numbers and PIDs of PMTs corresponding to them are thus derived from the PAT. Among them, from the PID of the PMT of the program number desired to be received, a video stream and an audio stream forming the program desired to be received can be extracted.

In the transport stream TS, packets housing data other than the above described video data, audio data, PAT and PMT can also be multiplexed. For brevity, however, a transport stream TS having multiplexed video, audio, PAT and PMT packets will now be considered.

FIG. 11 shows the configuration of a typical TS decoder which receives the transport stream TS as its input and yields video and audio data as its output. The TS decoder of FIG. 11 includes a TS demultiplexer 1, a video decoder 2, and an audio decoder 3.

Processing conducted by the TS demultiplexer 1 can be broadly divided into the following two categories.

One of the two is to extract the video stream and the audio stream of the desired program from the payloads of the packets and send the video stream and the audio stream to the video decoder 2 and the audio decoder 3, respectively.

The other of the two is to control the decoding timing of the video decoder 2 and the audio decoder 3 on the basis of the time stamp contained in the PES header. Hereafter, such processing conducted in the TS demultiplexer 1 of the TS decoder will be described.

First of all, the processing of taking out the video stream and the audio stream of the desired program will now be described. The TS demultiplexer 1 can partition the TS into packets by detecting a synchronization pattern of the inputted transport stream TS (to be concrete, a specific pattern 47 expressed in hexadecimal notation) and can derive the value of the PID included in each packet header. Subsequently, by analyzing contents of the PAT packet having a PID coincident with 0, the TS demultiplexer 1 can derive PIDs of PMT packets of a plurality of programs. Subsequently, by analyzing contents of packets having a PID coincident with the PID of the PMT of the desired program, the TS demultiplexer 1 can derive the PID of the video and audio data. Thus the TS demultiplexer transfers data of the payloads of the packets having PIDs coincident with PIDs of the video and audio data with PES headers excluded to the video decoder 2 and the audio decoder 3, respectively.

The timing control processing conducted by the TS demultiplexer 1 by using the time stamp will now be described by taking the case of video data as an example.

A time stamp is given to the unit called picture in the case of video data. The video stream has a hierarchical structure including several layers. Among them, the most upper layer is a layer called sequence. A picture layer is lower than the sequence layer. At the top of the sequence, a sequence header is disposed. In the sequence header, information such as the screen size needed for decoding is housed beforehand.

In the case of the initial state immediately after the power ON or in the case where programs are switched by alteration of the desired program, the TS demultiplexer 1 must detect the sequence header contained in the video stream and effect timing control from a subsequent picture. Once decoding has been started, the TS demultiplexer 1 detects a picture header from the video stream and can associate pictures with time stamps. For finding positions of the sequence header and picture header, it is necessary to search for 4-byte specific patterns located at the tops of respective headers and called respectively sequence header code and picture start code. In the case of the audio stream as well, it is necessary to associate the unit called frame with a time stamp. In this case, it is necessary to search the stream for a synchronization pattern located at the frame top. In other words, the processing of detecting the specific patterns, i.e., the sequence header code, the picture start code and the synchronization pattern contained in the stream is included in the video and audio timing control processing.

From the foregoing description, the processing conducted by the TS demultiplexer 1 is divided into the following four categories:

(1) packet top adjust using synchronization detection (packet partition identification processing);

(2) packet selection using packet identification information (PID);

(3) analysis of specific pattern of the header and processing branch; and (4) timing control of desired video/audio output data.

SUMMARY OF THE INVENTION

The multiplexed stream demultiplexer configured as described above has a buffer for each of packet kinds, and their management becomes complicated. Studies conducted by the present inventors revealed the following problem. If it is attempted to conduct the PSI analysis, TS header skipping, and buffer management under the management effected by the CPU of a single PSI analyzing unit 404, each processing of a plurality of buffer managements must be conducted independently and consequently the load of the analyzing processing unit formed by the CPU becomes heavy.

The present invention has been made in order to solve such a problem. A first object of the present invention is to provide a data demultiplexer capable of lightening the processing of the analyzing processing unit.

Studies effected by the present inventors revealed that attempting to realize a multiplexed stream apparatus conducting the above described processing (1) through (4) posed the following problem.

First of all, if it is attempted to form the entire apparatus by using hardware alone, the scale of especially the hardware conducting the processing (3) and (4) becomes comparatively large. Besides this, the packet header contains information other than the synchronization and the packet identification information (PID), and it is difficult to deal with it by using the hardware alone.

If it is attempted to implement the above described processing (1) through (4) by using a general purpose CPU (Central Processing Unit) and software, then a vast amount of steps are spent in detecting specific patterns such as the synchronization pattern and the sequence header code described in (1) and (3), resulting in a fear of interfering with the processing of (2) and (4). Especially in the case where the bit rate is as high as several tens MHz and the header structure is complicated as in the transport stream TS, it is considerably difficult to execute all of the processing (1) through (4) by using the software processing of the CPU. In other words, neither the method of conduct all processing by using the hardware alone nor the method of conduct all processing by using the software of the CPU alone is realistic.

In view of such a problem, the present invention has been made. A second object of the present invention is to provide a low-cost data demultiplexer capable of correctly executing demultiplexing processing even when demultiplexing a multiplexed stream having a high bit rate and a complicated header structure.

The above described first object is basically achieved by a data demultiplexer including a write controller, a memory, an analyzing processing unit, and transfer control units. The write controller writes packets which have arrived thereat into the memory in the order of arrival and sends the write information to the analyzing processing unit. The analyzing processing unit analyzes packets in the order of arrival on the basis of the above described write information and sends only the result of analysis to the transfer control unit. On the basis of the result of analysis, the transfer control unit sends data read from the memory in the order of packet arrival to the decoder.

A concrete implementation form of the present invention achieving the above described first object is a data demultiplexer for demultiplexing an input stream formed by multiplexing a plurality of data and outputting desired data, the data demultiplexer including: a memory (104, 304) for storing data of the input stream in a plurality of store areas; a write controller (102, 302) for receiving the data of the input stream and writing data of a packet unit derived from the data into one store area included in the plurality of store areas of the memory; an analyzing processing unit (105) for reading out the data of the packet unit from the memory (104, 304), analyzing a kind of the data read out, and generating analyzed information; and a plurality of transfer control units (106, 107) responsive to the analyzed information supplied from the analyzing processing unit (105) to transfer the data read out from the memory (104, 304) to outputs thereof, wherein when writing data of a plurality of packet units successively from the write controller (102, 302) into the memory (104, 304), write address information pieces respectively of the data of a plurality of packet units are successively stored in a FIFO memory (FIFO), wherein the analyzing processing unit (105) reads out data of packet units successively from the memory (104, 304) in accordance with the write address information pieces successively read out from the FIFO memory (FIFO), and generates successively analyzed information pieces by analyzing kinds of the data, and wherein one of the plurality of transfer control units (106, 107) selectively responds to the analyzed information supplied from the analyzing processing unit (105), to transfer data read out from one store area of the memory (104, 304) to output thereof. (See FIGS. 1 and 4.)

In a further concrete implementation form of the present invention achieving the above described first object, the memory (104, 304), the analyzing processing unit (105), and the plurality of transfer control units (106, 107) are connected to each other via a bus (103), the analyzing processing unit (105) includes a CPU, and the FIFO memory includes hardware contained within the CPU of the analyzing processing unit (105).

In another further concrete implementation form of the present invention achieving the above described first object, the memory (104, 304), the analyzing processing unit (105), and the plurality of transfer control units (106, 107) are connected to each other via a bus (103), the analyzing processing unit (105) includes a CPU, and the FIFO memory includes software for controlling operation of the CPU of the analyzing processing unit (105).

In a more preferred implementation form of the present invention, one of the plurality of transfer control units (106, 107) selectively responds to the analyzed information supplied from the analyzing processing unit (105) as a transfer request interruption signal, to read out data from one store area of the memory (104, 304) and transfer the data read out to output thereof.

In a preferred implementation form of the present invention achieving the above described first object, the input stream includes data obtained by multiplexing at least two kinds of data including video data and audio data, the plurality of transfer control units (106, 107) include at least two transfer control units including a video transfer control unit (106) and an audio transfer control unit (107); the analyzing processing unit (105) reads out data of packet units successively from the memory (104, 304) in accordance with the write address information pieces successively read out from the FIFO memory (FIFO), and generates successively analyzed information pieces by analyzing at least two kinds of the data including video data and audio data; the video transfer control unit (106) selectively responds to the analyzed information supplied from the analyzing processing unit (105) including the kind of video data, to transfer data read out from one store area of the memory (104, 304) to output thereof; and the audio transfer control unit (107) selectively responds to the analyzed information supplied from the analyzing processing unit (105) including the kind of audio data, to transfer data read out from one store area of the memory (104, 304) to output thereof.

In a more preferred implementation form of the present invention achieving the above described first object, the memory (304) includes a dual port memory having a write data terminal connected to the write controller and a read data terminal connected to the plurality of transfer control units.

In order to achieve the above described second object, a data demultiplexer according to a concrete implementation form of the present invention for demultiplexing an input stream formed by multiplexing a plurality of data and outputting desired output data includes a memory (5) for storing data of the input stream; a write controller (4) for receiving the data of the input stream and writing packet data obtained from the received data into the memory (5); and an analyzing processing unit (6) for reading out the packet data from the memory (5) and analyzing a kind of the packet data read out, wherein the write controller (4) includes: a synchronization detector (7) for detecting a packet header having a predetermined synchronization pattern from the data of the input stream; a packet selection unit (18) for selecting packet data having packet identification information specified by the analyzing processing unit (6) from the data of the input stream; and a packet detection store unit (19) for finding the selected packet data selected by the packet detection store unit (18) to have a specific pattern for timing control processing of packet data forming the desired output data, storing the packet data in the memory (5), and outputting additional information of a result of the detection, wherein the analyzing processing unit (6) includes a CPU controlled in operation by software, wherein the CPU (6) derives packet identification information of packet data forming the desired output data from the packet data read out from the memory (5) and sets the packet identification information in the packet selection unit (18), and wherein the CPU (6) starts and executes timing control processing of the packet data having the additional information in response to the additional information outputted from the packet detection store unit (19). (See FIG. 6.)

By the above described concrete implementation form of the present invention, the above described second object can be achieved for the following reasons.

(1) Top adjust of a packet using synchronization detection (packet partition identification processing) is executed in a hardware scheme by the synchronization detector (7) included in the write controller (4) to detect a packet header having a predetermined synchronization pattern from the data of the input stream. Therefore, the number of software steps can be reduced.

(2) Packet selection using packet identification information (PID) is executed in a hardware scheme by the packet selection unit (18) included in the write controller (4) to select a packet having specified packet identification information from the data of the input stream. Therefore, the number of software steps can be reduced.

(3) Analysis of the specific pattern of the header and processing branch are executed by hardware of the packet detection store unit (19) for finding the selected packet data to have a specific pattern and outputting additional information of the result of detection and software operation of the CPU analyzing processing unit (6) for analyzing the kind of packet data read out from the memory (5). Therefore, a reduction of the hardware scale and a reduction of software steps become possible.

(4) As for the timing control of desired output data such as video data and audio data, the analyzing processing unit (6) responds to outputting, from the packet detection store unit (19), of the additional information indicating the selection of the packet forming the desired output data in the packet selection unit (18) and starts and executes the timing control processing of packet data having the additional information. Therefore, it can be made unnecessary for the analyzing processing unit (6) to conduct always detection of a specific pattern for timing control. As a result, the amount of processing of the analyzing processing unit (6) can be reduced.

In order to achieve the above described second object, a data demultiplexer according to another concrete implementation form of the present invention includes: a memory (5) for storing data of the input stream; a write controller (4) for receiving the data of the input stream and writing packet data obtained from the received data into the memory (5); and an analyzing processing unit (6) for reading out the packet data from the memory (5) and analyzing a kind of the packet data read out, wherein the write controller (4) includes: a selection unit (9, 15) for selecting packet data having packet identification information specified by the analyzing processing unit (6) from the data of the input stream and storing the packet data in the memory (5); a detector (14) for detecting a packet header having a predetermined synchronization pattern from the data of the input stream, finding the selected packet data selected by the selection unit (9, 15) to have a specific pattern for timing control processing of packet data forming the desired output data, and outputting additional information of a result of the detection, wherein the analyzing processing unit (6) includes a CPU controlled in operation by software, wherein the CPU (6) derives packet identification information of packet data forming the desired output data from the packet data read out from the memory (5) and sets the packet identification information in the selection unit (9, 15), and wherein the CPU (6) starts and executes timing control processing of the packet data having the additional information in response to the additional information outputted from the detector (14). (See FIG. 10.)

By the above described other concrete implementation form of the present invention, the above described second object can be achieved for the following reasons.

(1) Top adjust of a packet using synchronization detection (packet partition identification processing) is executed in a hardware scheme by the detector (14) included in the write controller (4) to detect a packet header having a predetermined synchronization pattern from the data of the input stream. Therefore, the number of software steps can be reduced.

(2) Packet selection using packet identification information (PID) is executed in a hardware scheme by the selection unit (9, 15) included in the write controller (4) to select a packet having specified packet identification information from the data of the input stream. Therefore, the number of software steps can be reduced.

(3) Analysis of the specific pattern of the header and processing branch are executed by hardware of the detector (14) for finding the selected packet data to have a specific pattern and outputting additional information of the result of detection and software operation of the CPU analyzing processing unit (6) for analyzing the kind of packet data read out from the memory (5). Therefore, a reduction of the hardware scale and a reduction of software steps become possible.

(4) As for the timing control of desired output data such as video data and audio data, the analyzing processing unit (6) responds to outputting, from the selection unit (9, 15), of the additional information indicating the selection of the packet forming the desired output data in the selection unit (9, 15) and starts and executes the timing control processing of packet data having the additional information. Therefore, it can be made unnecessary for the analyzing processing unit (6) to conduct always detection of a specific pattern for timing control. As a result, the amount of processing of the analyzing processing unit (6) can be reduced.

Other objects and novel features of the present invention will be apparent from the preferred embodiments hereafter described.

DESCRIPTION OF THE PREFERRED EMBODIMENTS

Figure 1:
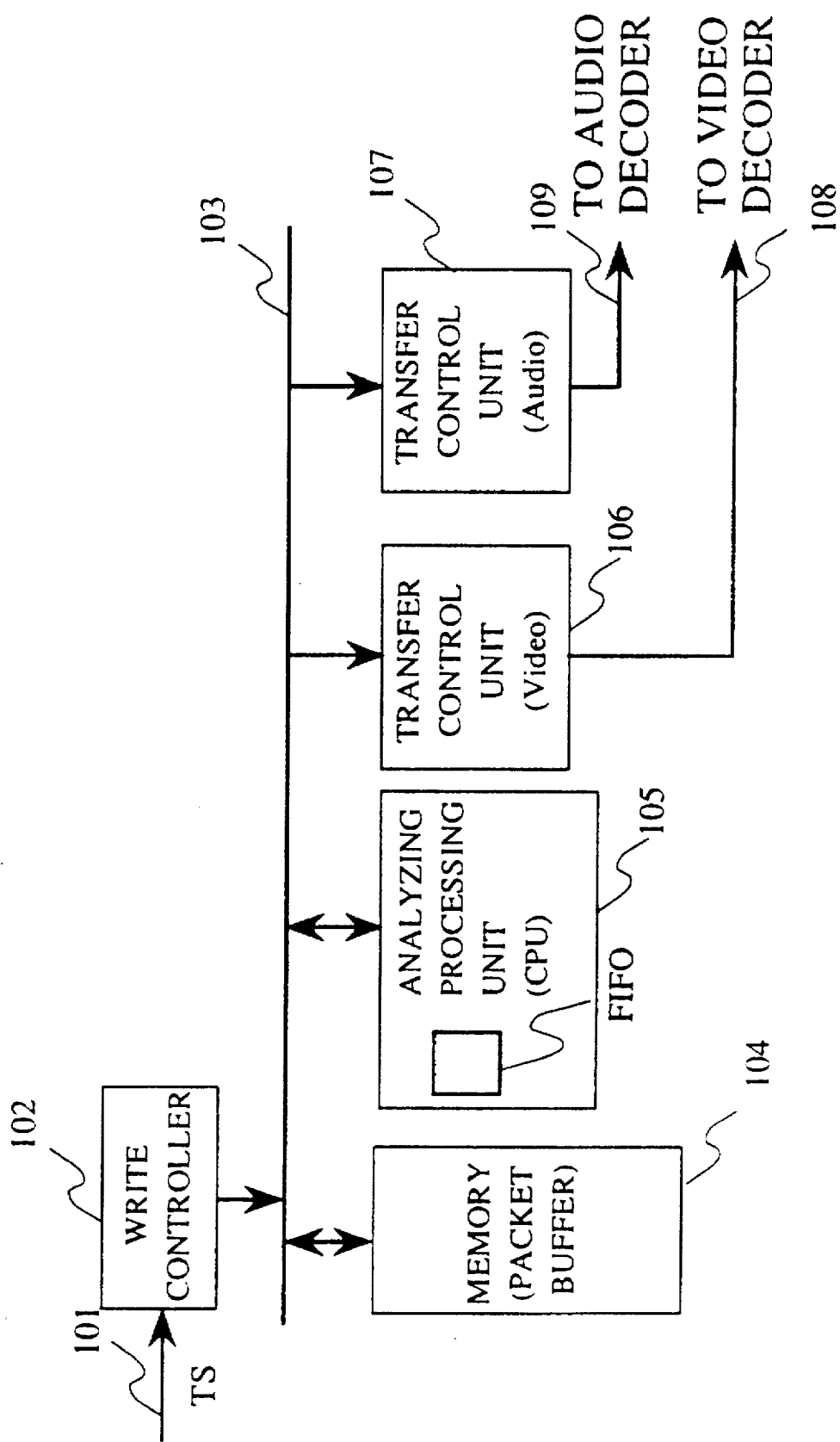
FIG. 1 is a diagram showing the configuration of an embodiment of a TS demultiplexer according to the present invention.
Figure 2:
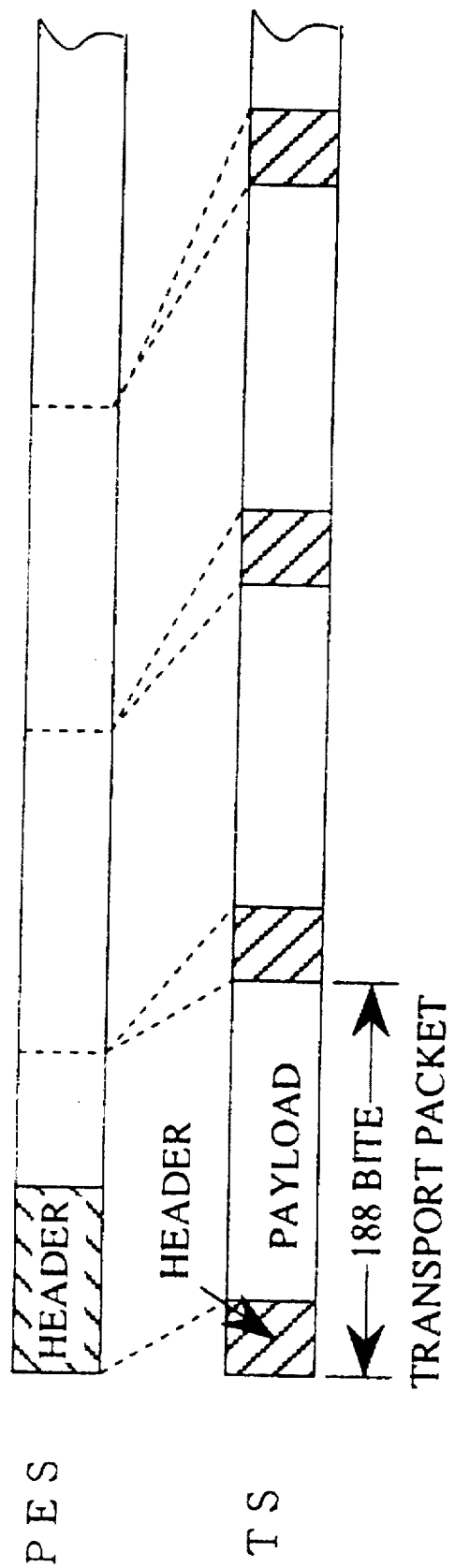
FIG. 2 is a diagram showing the relation between the PES and the transport stream TS.

Hereafter, the configuration and operation of embodiments of a multiplexed stream demultiplexer according to the present invention will be described in detail by referring to the drawing. Embodiments hereafter described relate to an apparatus for demultiplexing the transport stream TS stipulated by the MPEG 2 system standard. However, they can be applied to a multiplexed stream demultiplexer receiving another multiplexed stream as its input and other data demultiplexers as well.

FIG. 1 is a diagram showing an embodiment of a multiplexed stream demultiplexer according to the present invention which achieves the above described first object.

In FIG. 1, numeral 102 denotes a write controller for writing inputted TS data 101 into a memory 104. Numeral 103 denotes a data bus. Numeral 104 denotes a memory. Numeral 105 denotes an analyzing processing unit for analyzing TS packets. Numeral 106 denotes a video transfer control unit for transferring video data to a video decoder. Numeral 107 denotes an audio transfer control unit for transferring audio data to an audio decoder.

In the memory 104, a packet buffer for storing received TS packets is provided. The packet buffer can store a plurality of packets.

Since the analyzing processing unit 105 involves complicated processing, it is implemented by using a CPU (Central Processing Unit).

Furthermore, in the main memory 104, a store area is allocated to a main memory storing software for controlling the operation of the CPU functioning as the analyzing processing unit 105. This main memory can also be connected to the data bus 103 separately from the buffer memory 104.

With reference to FIG. 1, the transmitted TS data 101 is partitioned by the write controller 102 while taking a packet as the unit and transferred to the memory 104 with a packet as the unit. This transfer control from the write controller 102 to the memory 104 may be effected by the write controller 102 itself. Alternatively, control over DMA (Direct Memory Access) may be effected by the analyzing processing unit 105 by informing the analyzing processing unit 105 of arrival of a packet by means of an interruption or the like. In the latter case, when the CPU functioning as the analyzing processing unit 105 has received a DMA transfer interruption request, the TS data 101 are directly DMA-transferred from the write controller 102 to the memory 104 via the data bus 103 while taking a packet as the unit.

In both cases, in the DMA transfer of the TS data 101 with a packet taken as the unit from the write controller 102 to the memory 104, packet write address information representing where in the memory 104 a packet has been written is sent to the analyzing processing unit 105. As this packet write address information, either an address signal in the memory or a packet buffer number may be used. Hereafter, however, the case of the packet buffer number will be described.

On the basis of the packet write address information represented by the above described packet buffer number, the analyzing processing unit 105 performs the packet analysis. Since the packet analysis must be performed in the order of packet arrival, the analyzing processing unit 105 has a first-in first-out memory (hereafter referred to as FIFO) and the packet write address information (packet buffer number) is stored in this FIFO one after another. Since the analyzing processing unit 105 is formed by the CPU as described above, this FIFO may be implemented by a special purpose hardware included in the CPU or it may be implemented by software controlling the operation of the CPU stored in the memory 104 functioning as the main memory.

The analyzing processing unit 105 reads out packet buffer numbers one after another from the FIFO thus implemented, reads out data from the packet buffer of the memory 104 conforming with this packet buffer number, and performs analyzing processing on data of this packet. If as a result of the analysis the pertinent packet is PSI (Program Specific Information), the result of analysis is held. If the pertinent packet is a packet of video or audio data, then the packet buffer number, kind information of video/audio, and the location of data which are included in the data of the packet and which should be transferred to the video or audio decoder are sent to the video transfer control unit 106 or the audio transfer control unit 107 as transfer information.

Upon receiving the above described transfer information from the FIFO, the video transfer control unit 106 or the audio transfer unit 107 transfers the data of the packet read out from the memory 104 to its output selectively according to the kind of video/audio in the order of packet arrival. Specifically, if the transfer information supplied from the FIFO indicates that the data of the packet read out are video data, then the video transfer control unit 106 transfers the data of the packet read out to its output selectively in response to the transfer information. At this time, the video transfer control unit 106 reads out data of the pertinent packet of the memory 104 in response to the transfer information supplied from the FIFO as the DMA transfer request interruption signal, and transfers the data to the video decoder located at its output. If on the contrary the transfer information supplied from the FIFO indicates that the data of the packet read out are audio data, then the audio transfer control unit 107 transfers the data of the packet read out to its output selectively in response to the transfer information. At this time, the audio transfer control unit 107 reads out data of the pertinent packet of the memory 104 in response to the transfer information supplied from the FIFO as the DMA transfer request interruption signal, and transfers the data to the audio decoder located at its output. The actual transfer of the data to the output conducted by the video transfer control unit 106 or the audio transfer control unit 107 is effected in response to a request issued from the video or audio decoder (108, 109).

If the analyzing processing of the PSI conducted by the analyzing processing unit 105 has been completed, or if the transfer to the video transfer control unit 106 or the audio transfer control unit 107 has been finished and the transfer processing of one packet has been finished, then the analyzing processing unit 105, the video transfer control unit 106, or the audio transfer control unit 107 transfers the packet buffer number in which the packet finished in analyzing processing or transfer processing was stored to the write controller 102 via the data bus 103. In response to this transferred packet buffer number, the write controller 102 makes the pertinent packet buffer vacant to make it possible to store the next arriving TS packet.

Figure 3:
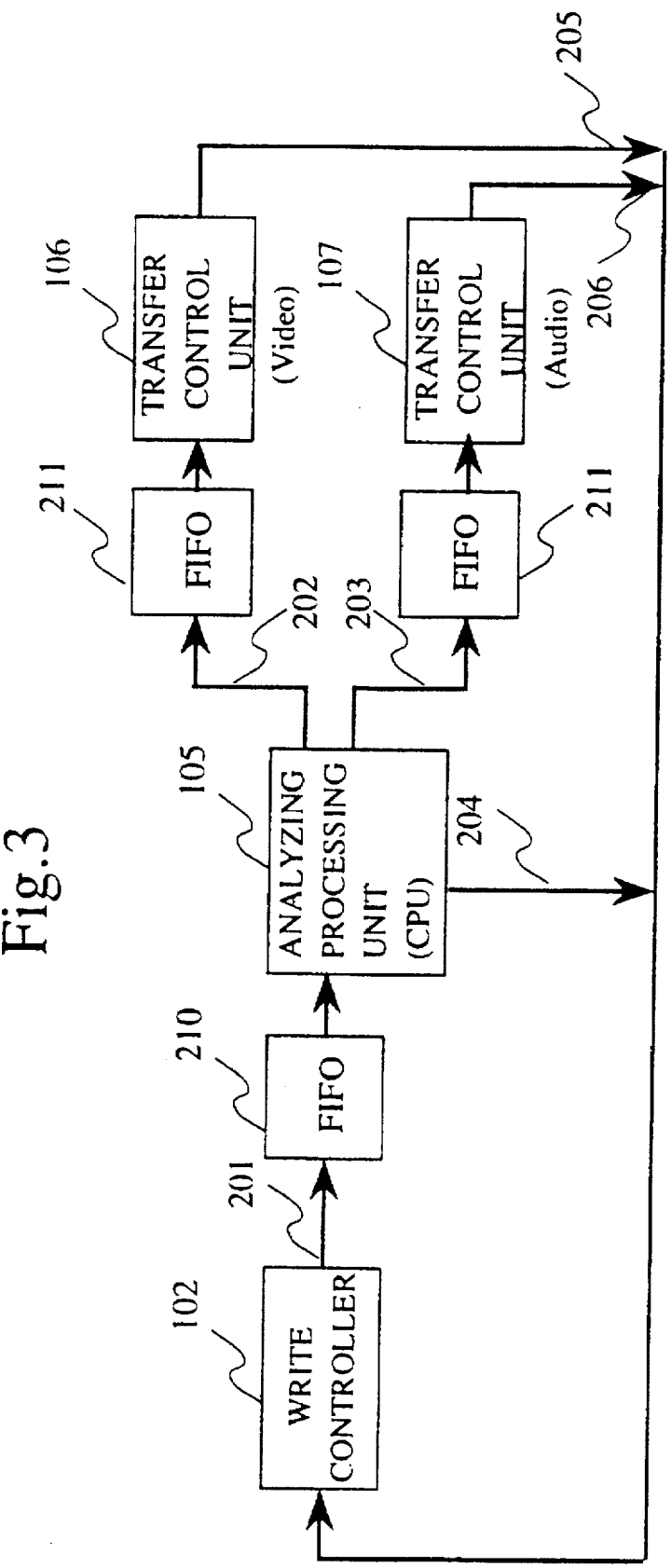
FIG. 3 is a diagram illustrating the flow of management information in the embodiment of the TS demultiplexer shown in FIG. 1.

The flow of the management information of the multiplexed stream demultiplexer having the configuration of FIG. 1 heretofore described is shown in FIG. 3. When a TS packet arrives and data of one packet are successively written into the packet buffer of the memory 104 by the write controller 102, numbers of the packet buffers subjected to writing are successively outputted from the write controller 102 (201). The outputted packet buffer numbers are sent to the analyzing processing unit 105 via the FIFO 210 and read out successively by the analyzing processing unit 105. The order of readout of packet buffer numbers from the FIFO becomes the order of writing the packet buffers into the FIFO. In other words, the analyzing processing unit 105 analyzes contents of packets in the order of packet arrival by reading out the packet buffer numbers from the FIFO 210.

If the packet is the PSI, then the pertinent packet buffer number is transferred to the write controller 102 after completion of analyzing (204), and the pertinent packet buffer of the memory 104 is made "vacant."

If on the contrary the packet has video or audio contents, the transfer information such as the packet buffer number is transferred from the FIFO 211 to the pertinent transfer controller 106 or 107. Selectively in response to the transfer information read out from the FIFO 211, the transfer control unit 106 or 107 transfers the video or audio data corresponding to one packet to the video or audio decoder located at the output side. To be concrete, the video or audio transfer control unit 106 or 107 reads out data of the pertinent packet of the memory 104 in response to the transfer information supplied from the FIFO as the DMA transfer request interruption signal and transfers the data to the video or audio decoder located at its output. After the transfer of the one packet has been finished, the transfer control unit 106 or 107 sends the pertinent packet buffer number to the write controller (205, 206) and makes the pertinent packet buffer of the memory 104 "vacant."

Subsequently, the write controller 102 writes the next arriving TS packet into the above described packet made vacant. If at this time there are a plurality of "vacant" packet buffers, the TS packet which has arrived can be written into an arbitrary packet buffer among them. This is because analyzing and transfer to the decoder can be conducted in the order of arrival of TS packets despite writing TS packets into arbitrary packet buffers of the memory 104 as described before. By doing so, buffer management can be simplified.

In the foregoing description, only the PSI and the video and audio packet required for processing have been described. Besides them, however, packets which are not required for processing such as data of other programs are also contained in the actual TS packets. Such invalid packets must be discarded. By using the PID given to the packet, however, invalid packets can be distinguished. Therefore, the amount of transferred data can be reduced by adopting such a configuration that PID values of packets required for processing are sent from the analyzing processing unit 105 to the write controller 102 and only packets having coincident PID values are written into the packet buffer.

Figure 4:
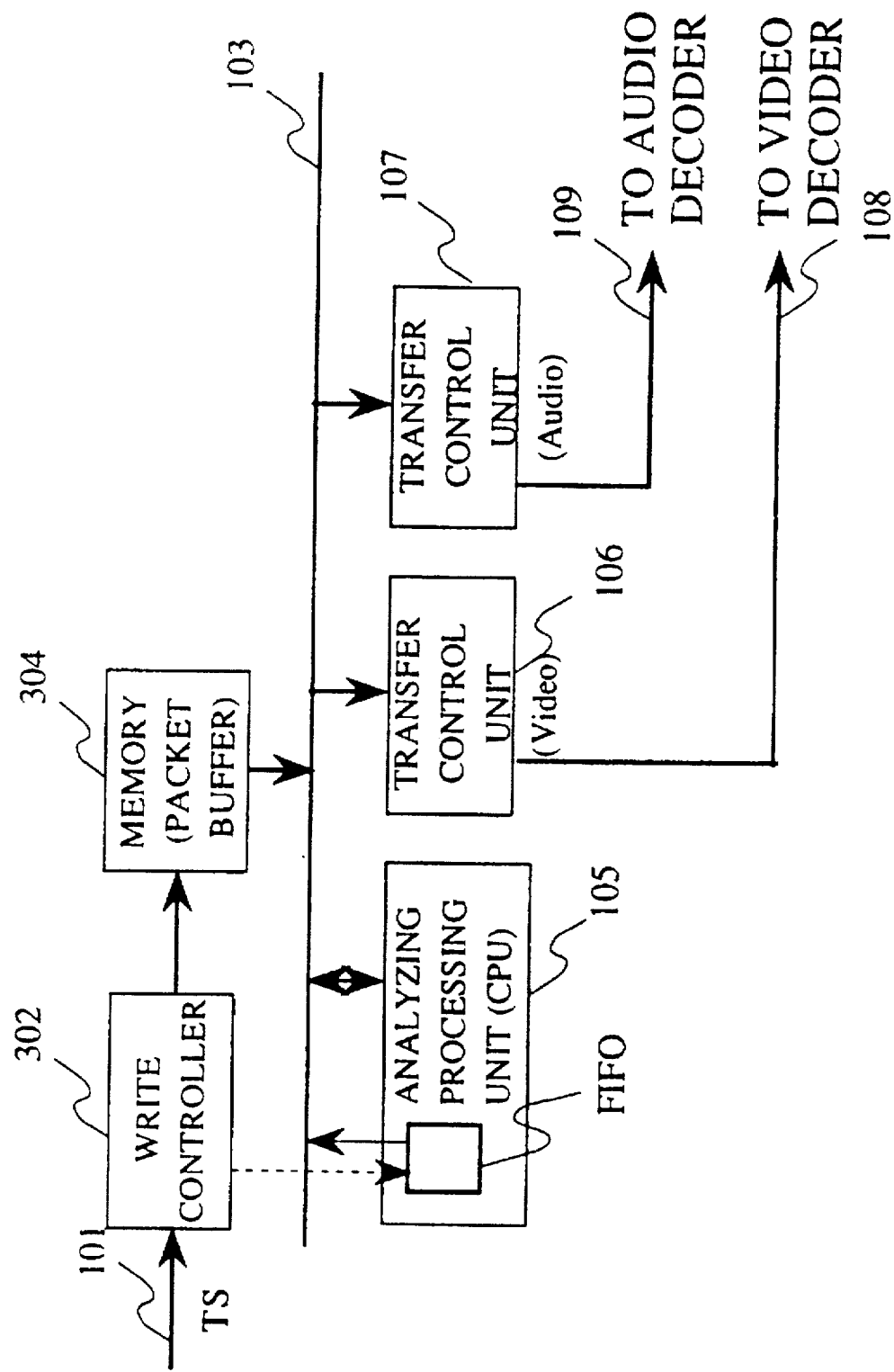
FIG. 4 is a diagram showing the configuration of another embodiment of a TS demultiplexer according to the present invention.
Figure 5:
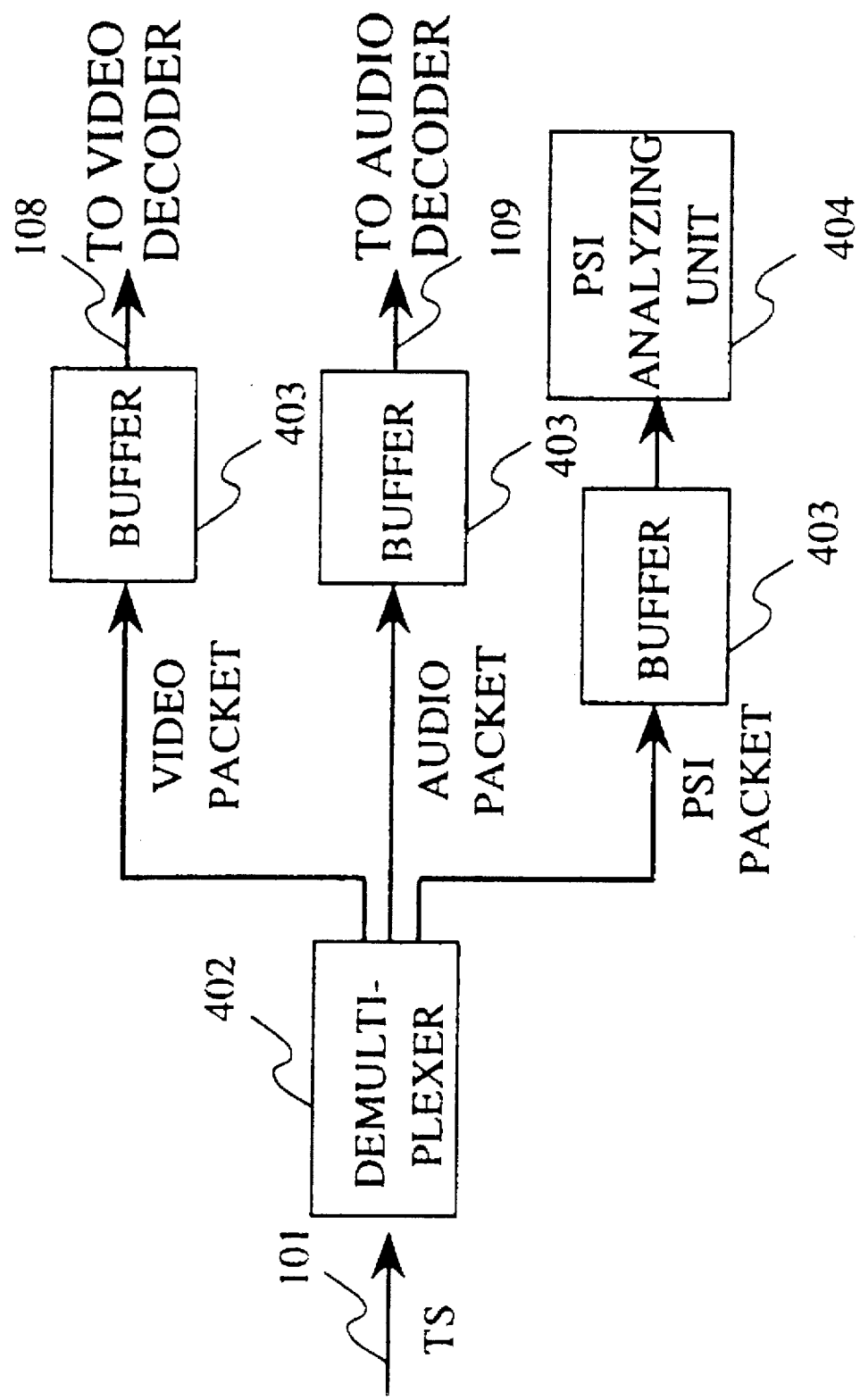
FIG. 5 is a diagram showing the configuration of a typical TS decoder.

FIG. 4 shows the configuration of another embodiment of a multiplexed stream demultiplexer according to the present invention.

In FIG. 4, numeral 302 denotes a write controller for writing inputted TS packets into a memory 304. Numeral 304 denotes a dual port memory. Numeral 103 denotes a data bus. Numeral 105 denotes an analyzing processing unit for analyzing TS packets. Numeral 106 denotes a video transfer control unit for transferring video data to a video decoder. Numeral 107 denotes an audio transfer control unit for transferring audio data to an audio decoder.

The embodiment of FIG. 4 is especially different from the embodiment of FIG. 1 in that the memory 304 for storing a plurality of received TS packets is a dual port memory for which writing and reading can be conducted independently. Specifically, a write data terminal of the dual port memory 304 is connected to the write controller 302. A read data terminal is connected to the video transfer control unit 106 and the audio transfer control unit 107 via the data bus 103. Writing data into the memory can be executed in parallel with reading data from the memory. Therefore, in parallel with processing of successively writing TS packets from the write controller 302 into the dual port memory 304, processing of successively reading out data of one byte from the dual port memory 304 and transferring the data to the video transfer control unit 106 and the audio transfer control unit 107 can be conducted. In the same way as the embodiment of FIG. 1, the processing of successive writing and the processing of successive reading and transfer are conducted according to the packet buffer numbers successively stored in the FIFO of the CPU 105. In order to conduct the parallel processing of the dual port memory 304, it is desirable that the path for transferring the packet buffer number from the write controller 302 to the FIFO of the CPU 105 is independent of the data bus 103 as indicated by a broken line in FIG. 4.

Since the operation of the embodiment of the multiplexed stream demultiplexer according to the present invention is essentially the same as the embodiment of FIG. 1, it will not be described.

By adopting either of the configurations of the two embodiments heretofore described, the buffer management in the analyzing processing unit formed by the CPU is simplified and the load of the analyzing processing unit formed by the CPU is lightened.

Furthermore, by adopting the configuration of the embodiment shown in FIG. 4, it becomes unnecessary to use the data bus 103 to which the CPU is connected in order to write the TS data into the memory 304 and the write controller 302 and the analyzing processing unit 105 can be used more efficiently.

While preferred embodiments of the present invention have heretofore been described in detail, the present invention is not limited to the above described concrete embodiments. It is a matter of course that various modifications are possible within the scope of its technical conception.

For example, the case where the analyzing processing unit is formed by a CPU has been illustrated in the foregoing description of the embodiments. In the case where this portion is formed by special purpose hardware as well, processing can be conducted in the same way. Furthermore, the write controller 102, 302, the video transfer control unit 106, or the audio transfer control unit 107 need not necessarily be special purpose hardware. It is a matter of course that any or all of them can be replaced with processing using CPU.

Hereafter, a first embodiment of the present invention achieving the above described second object will be described.

Figure 6:
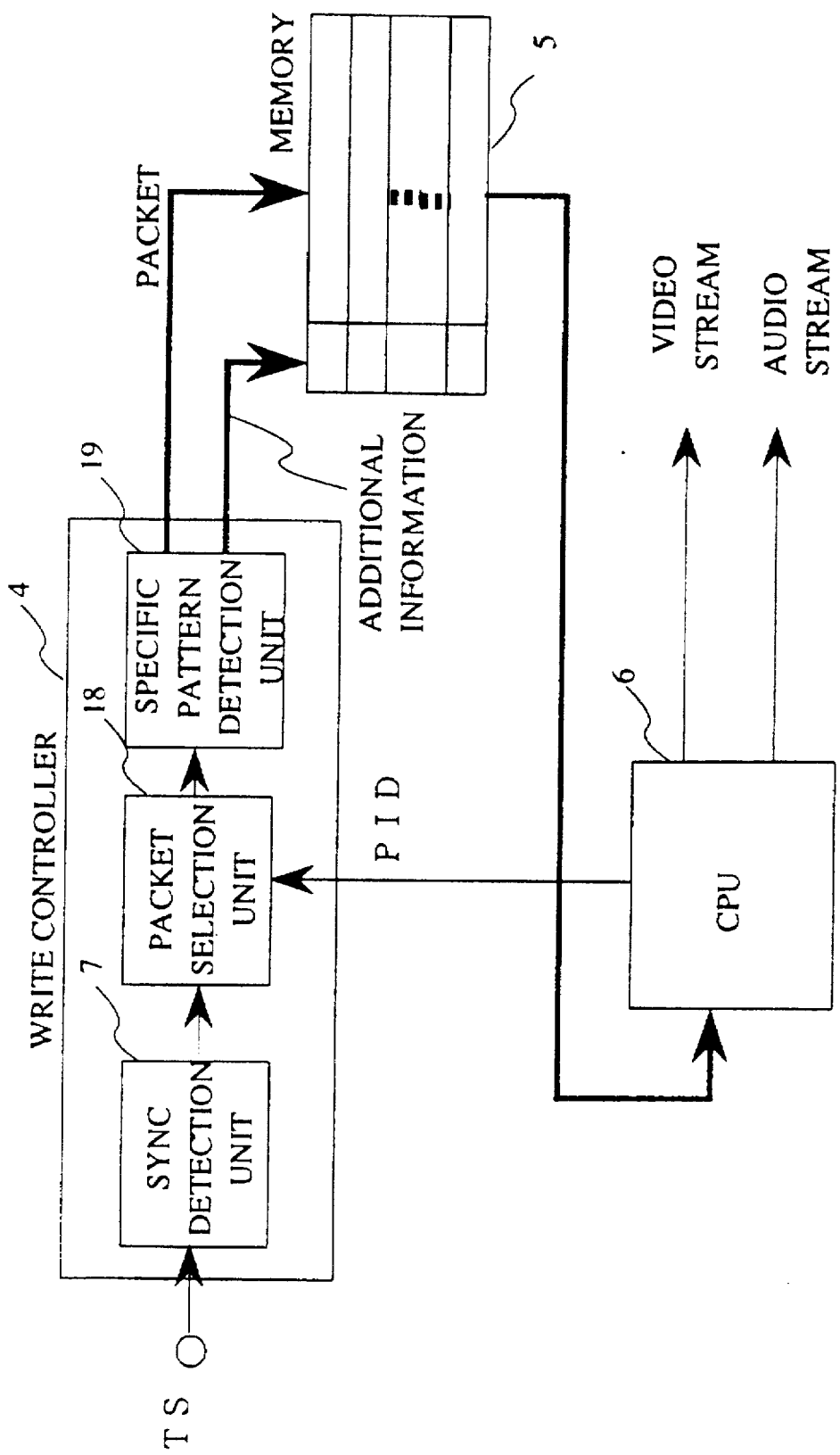
FIG. 6 is a diagram showing a configuration of a further embodiment of a TS demultiplexer according to the present invention.

FIG. 6 shows the configuration of the present embodiment of a TS demultiplexer. The TS demultiplexer of FIG. 6 is formed by a write controller 4, a memory 5, and a CPU 6 functioning as an analyzing processing unit. A transport stream TS having multiplexed video and audio packet data is inputted to the write controller 4. Desired video and audio output data can be separated by analyzing processing conducted by the CPU 6 functioning as the analyzing processing unit. The operation of the CPU 6 functioning as the analyzing processing unit is controlled by software of a program stored in a main memory which is not illustrated.

The write controller 4 is formed by a synchronization detection unit 7, a packet selection unit 18, and a specific pattern detection unit 19 functioning as a packet detection store unit.

The synchronization detection unit 7 detects packet top by detecting a predetermined synchronization pattern (to be concrete, 47 in hexadecimal notation and 01000111 in binary notation) contained in the packet header of the transport stream TS. The synchronization detection unit 7 thus partitions the TS data into transport packet units each having a fixed length of 188 bytes.

The packet selection unit 18 selects a packet having packet identification information PID coincident with the packet identification information PID preset by the CPU 6 and transfers the packet from its input to its output. Packets which are not selected are effectively discarded. In response to the packet identification information PID preset in the packet selection unit 18 by the CPU 16, the packet selection unit 18 selects the PAT, PMT, video or audio packet data and transfers it to the specific pattern detection unit 19.

The specific pattern detection unit 19 functioning as the packet detection store unit detects a specific pattern of the packet data selected by the packet selection unit 18 and stores the result of detection in the memory 5 located at the output thereof together with the packet as additional information of the packet. Specific patterns detected by this specific pattern detection unit 19 include the sequence header code and the picture start code of the video stream, and the synchronization pattern of the audio stream.

The packet data and the additional information of that packet thus outputted selectively from the write controller 4 are stored in an adjacent address (the same entry) of the memory 5. Since this memory 5 reads out the packet data and the additional information according to the order of writing packet data from the write controller 4 and transfers them to the CPU 6 functioning as the analyzing processing unit, the memory 5 has the function of the FIFO (First-In First-Out) memory. This FIFO memory 5 may be formed by hardware, or alternatively it may be formed by a part of a main memory (not illustrated) controlled by the software of the CPU 6.

The CPU 6 derives the packet identification information of packet data forming desired video and audio output data from the packet data read out from the memory 5 and sets the packet identification information in the packet selection unit 18. Furthermore, in response to the additional information read out from the memory 5, the CPU 6 starts and executes the timing control processing of packet data having the additional information.

The processing operation of the data demultiplexer having the above described configuration shown in FIG. 6 will hereafter be described.

By the synchronization detection unit 7 for detecting a predetermined synchronization pattern, the transport stream TS is partitioned into transport packets each having a fixed length of 188 bytes. The PSI for obtaining the packet identification information PID of video and audio packets is formed by two-stage tables including the PAT and PMT. It is necessary to first extract a PAT packet, obtain the PID of a PMT from the payload of the PAT, extract a PMT packet, and obtain the PID of video and audio packets from the payload of the PMT.

Since it is necessary to first extract a PAT packet, therefore, the CPU 6 sets all "0"s (hereafter referred to as 0) of the PID of the PAT in the packet selection unit 18. As a result, the PAT packet having a PID equivalent to 0 is stored in the entry of the memory 5 via the specific pattern detection unit 19. At this time, additional information stored in this entry is "0" (the selected packet data does not contain the specific pattern).

Subsequently, a PAT packet having a PID equivalent to 0 is read out from the memory 5 and supplied to the CPU 6. Thereby, the CPU 6 analyzes the payload of the PAT packet to obtain the PID of the PMT and sets the PID of the PMT in the packet selection unit 18. As a result, the PMT packet is stored in the entry of the memory 5 via the specific pattern detection unit 19. At this time as well, the additional information stored in this entry becomes "0" in the same way.

Subsequently, the PMT packet is read out from the memory 5 and supplied to the CPU 6. Thereby, the CPU 6 analyzes the payload of the PMT packet to obtain the packet identification information PIDs of video and audio packets and sets PIDs of these packets in the packet selection unit 18.

If inputted packets are video or audio packets, therefore, the packet selection unit 18 selects these packets at its output and these selected packets are stored in the entry of the memory 5 via the specific pattern detection unit 19. If at this time the selected packet data contains a specific pattern, the additional information stored in the entry becomes "1". If the selected packet data does not contain a specific pattern, the additional information stored in the entry becomes "0".

Subsequently, the CPU 6 reads out packet data successively from the memory 5 of the FIFO, conducts analyzing processing on the packet data, and transfers the video/audio kind information obtained from the result of analyzing to the video decoder or the audio decoder together with the video stream or the audio stream.

By inputting the transport stream TS having multiplexed video and audio packet data to the write controller 4, desired video and audio output data can thus be separated by the analyzing processing conducted by the CPU 6 functioning as the analyzing processing unit.

Furthermore, in the multiplexed stream demultiplexer receiving a transport stream TS having multiplexed video and audio packet data as its input, it is necessary to conduct timing control processing on the video and audio streams by using time stamps as described before in the initial state immediately after power ON or when programs are switched by alteration of the desired program. For this purpose, it is necessary to detect the sequence header code and the picture start code from the packet data of the video stream and detect the position of the synchronization pattern from the packet data of the audio stream.

In the present embodiment, the CPU 6 responds to the additional information (information representing whether a specific pattern such as the sequence header code, the picture start code or the synchronization pattern is present in the packet data) read out from the memory 5. Only for the packets having a specific pattern, the CPU 6 conducts position detection processing of the specific pattern. In the initial state immediately after power ON or in the case where programs have been switched over due to alteration of the desired program, packet data must be discarded as far as the next sequence header as for the video stream. In such a case as well, the CPU 6 need to monitor and check up only the additional information in the present embodiment and packet data can be skipped as far as the packet of the additional information indicating the presence of a specific pattern. If the CPU 6 has detected the additional information indicating the presence of a specific pattern, the CPU 6 detects the specific patterns such as the sequence header code, the picture start code, and the synchronization pattern and starts and executes the timing control processing using time stamps.

In other words, the CPU 6 in the present embodiment responds selectively to only the additional information indicating the presence of a specific pattern. Therefore, the amount of processing of the CPU can be reduced as compared with the case where the CPU continuously executes monitoring whether a specific pattern exists in all packets selected by the write controller 4 for the reason that the number of packets in which specific patterns should be detected can be minimized, owing to the additional information. As a result, the demultiplex processing can be conducted correctly even in the case where the bit rate of the transport stream TS is high and the header is complicated.

As heretofore described, the CPU 6 functioning as the analyzing processing unit 6 analyzes the packet header from the packets and the additional information read out from the memory 5, extracts the video and audio streams on the basis of the PID, performs timing adjustment by using time stamps, and outputs the video and audio streams.

The present invention is not limited to the above described embodiment. It is a matter of course that various modifications can be made within the scope of the technical conception.

In variant embodiments hereafter described, the same items as the above described embodiment will not be described and only different points will be described.

By referring to FIG. 7, another embodiment according to the present invention will now be described. The present embodiment shows an example of a more concrete configuration of the transport stream TS of the above described embodiment. The TS demultiplexer 1 includes a CPU 6, an address bus 16, a data bus 17, a write controller 4, and a memory 5. The address bus 16 and the data bus 17 are controlled by the CPU 6. The write controller 4 and the memory 5 are connected to the address bus 16 and the data bus 17. The address from the CPU 6 is supplied to a video decoder 2, an audio decoder 3, the write controller 4, and the memory 5 to access these peripheral equipments.

Hereafter, the operation of the TS demultiplexer 1 shown in FIG. 7 will be described. Upon being supplied with the transport stream TS as the input, the write controller 4 selects only necessary packets on the basis of the PID set by the CPU 6 and store them in the memory 5 via the data bus 17 while taking a packet as the unit. The control of transfer from the write controller 4 to the memory 5 may be effected by the write controller 4 itself. Alternatively, the write controller 4 may inform the CPU 6 functioning as the analyzing processing unit of arrival of a packet by means of an interruption or the like to make the CPU 6 effect the DMA (Direct Memory Access) control. In the latter case, when the CPU 6 functioning as the analyzing processing unit has received a DMA transfer interruption request, the TS data are directly DMA-transferred from the write controller 4 to the memory 5 via the data bus 17 while taking a packet as the unit.

The write controller 4 outputs not only the packet data but also the additional information concerning the packet data. Here, the additional information indicates whether a specific pattern such as the sequence header code, the picture start code, and the synchronization pattern contained in the stream for video and audio timing control processing is present or not.

Concrete additional information includes information representing whether a sequence header code or a picture start code is present in payloads of video packets and information concerning whether a synchronization pattern is present in the audio stream. The additional information is outputted as an interruption signal for the CPU 6 after corresponding packet data has been written into the memory 5. Upon receiving the interruption signal, the CPU 6 generates additional information for the packet on the basis of the interruption signal and stores its value in an area preceding the store area of the packet in the memory 5.

The CPU 6 reads out the packet data and the corresponding additional information written into the memory 5. If the packet is a video or audio packet, the video stream or the audio stream stored in the payloads is transferred to the video decoder 2 or the audio decoder 3. If at this time there is a time stamp in the header of the PES, the CPU 6 searches the payload of the PES for the picture header of the picture corresponding to that time stamp. In the initial state immediately after the start of the TS demultiplex processing, the CPU 6 conducts the same processing for the picture located after the sequence header. Since in the present embodiment it is known beforehand whether a sequence header or a picture header is present on the basis of the sequence header detection signal or the picture header detection signal outputted from the write controller 4, this is used. For example, in the case where a sequence header is searched for, it becomes possible to skip packets which do not contain a sequence header by checking up the additional information of packets. Therefore, the amount of processing can be reduced as compared with the case where payloads of all video packets are searched.

Figure 7:
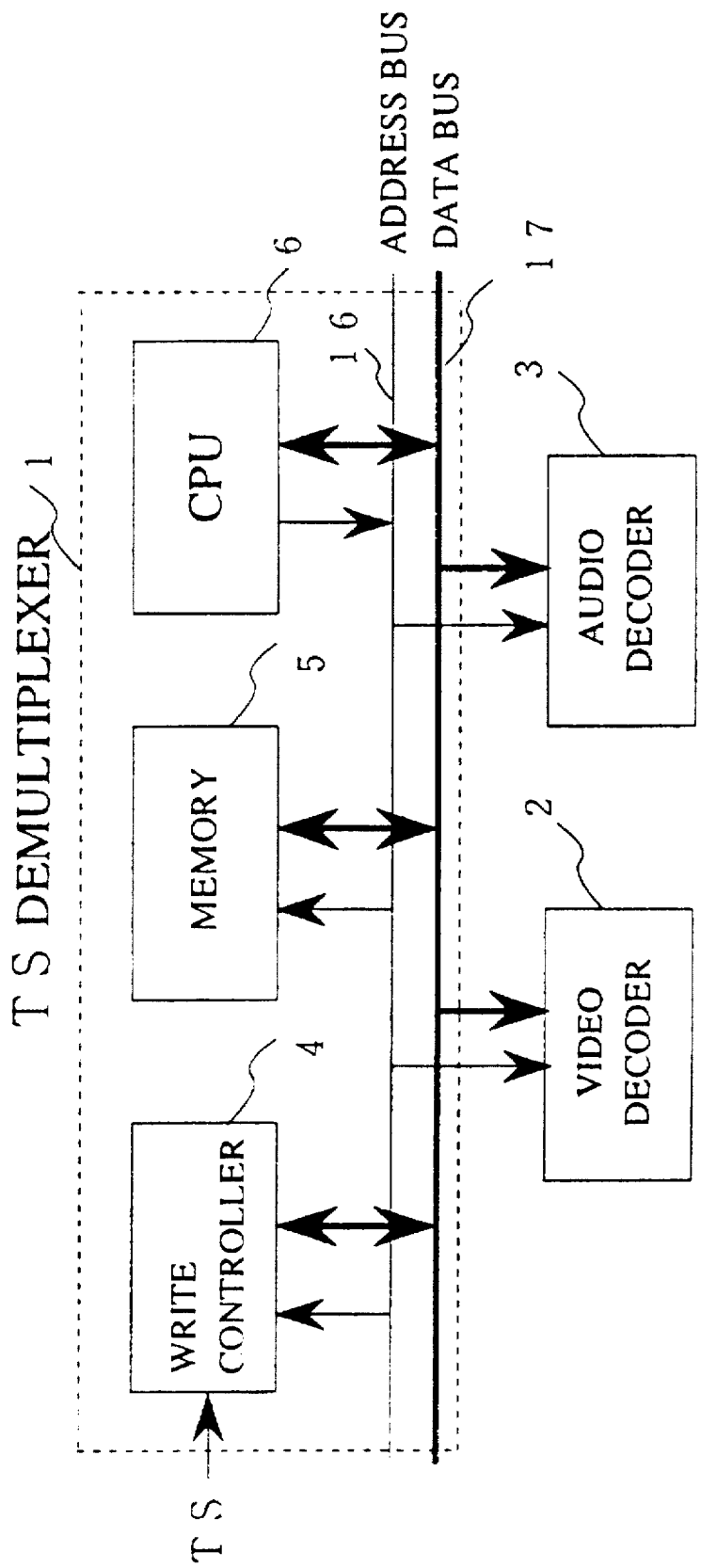
FIG. 7 is a diagram showing another configuration of a further embodiment of a TS demultiplexer according to the present invention.
Figure 8:
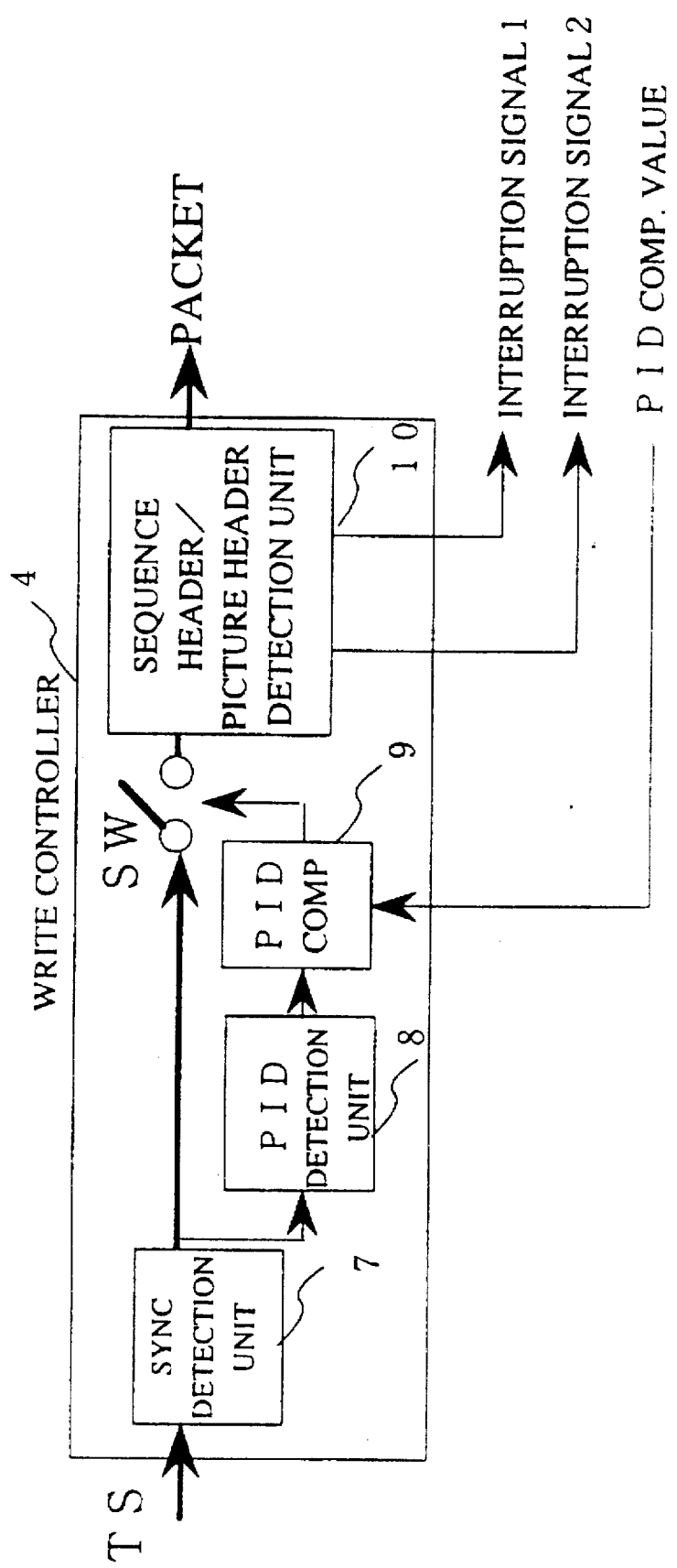
FIG. 8 is a diagram showing a configuration example of a write controller 4 illustrated in FIGS. 6 and 7.

FIG. 8 shows a configuration example of the write controller 4 of the embodiments shown in FIGS. 6 and 7. The write controller 4 is formed by a synchronization detection unit 7, a PID detection unit 8, a PID comparison unit 9, a switching unit SW, and a sequence header/picture header detection unit 10 functioning as a specific pattern inspection unit. Hereafter, operation of the write controller will be described.

The transport stream TS inputted to the write controller 4 is first processed by the synchronization detection unit 7. The synchronization detection unit 7 detects a synchronization pattern (47 in hexadecimal notation and 01000111 in binary notation) located in the first byte at the top of a packet and partitions the TS data into packets. Subsequently, the PID detection unit 8 obtains the PID from the header of the packet. The PID thus obtained is then sent to the PID comparison unit 9 and compared with a PID comparison value preset in the PID comparison unit 9. A packet coincident with at least one PID comparison value as a result of comparison is sent to the sequence header/picture header detection unit 10 of the next stage via the switching unit SW.

The sequence header/picture header detection unit 10 functioning as the specific pattern inspection unit 19 determines whether there is a sequence header or a picture header in payloads of packets sent from the PID detection unit 8. If as a result it is determined that there is a sequence header, an interruption signal 1 is generated after the packet data has been transferred to the memory 5. If it is determined that there is a picture header, an interruption signal 2 is generated in the same way.

If the interruption signal 1 or 2 is inputted to the CPU 6, additional information of the packet according to the interruption signal is generated and its value is held. As this hold circuit of the additional information, the memory 5 may be used. Allocation of the interruption signals is not limited to this. Also in the case where there are both a sequence header and a picture and in the case where neither of them is present, the interruption signals may be allocated independently. Instead of outputting the result of detection of the sequence header and the picture header as the interruption signal of the CPU 6, it is also possible to write it directly from the write controller 4 into the memory 5 as the additional information of the packet.

Figure 9:
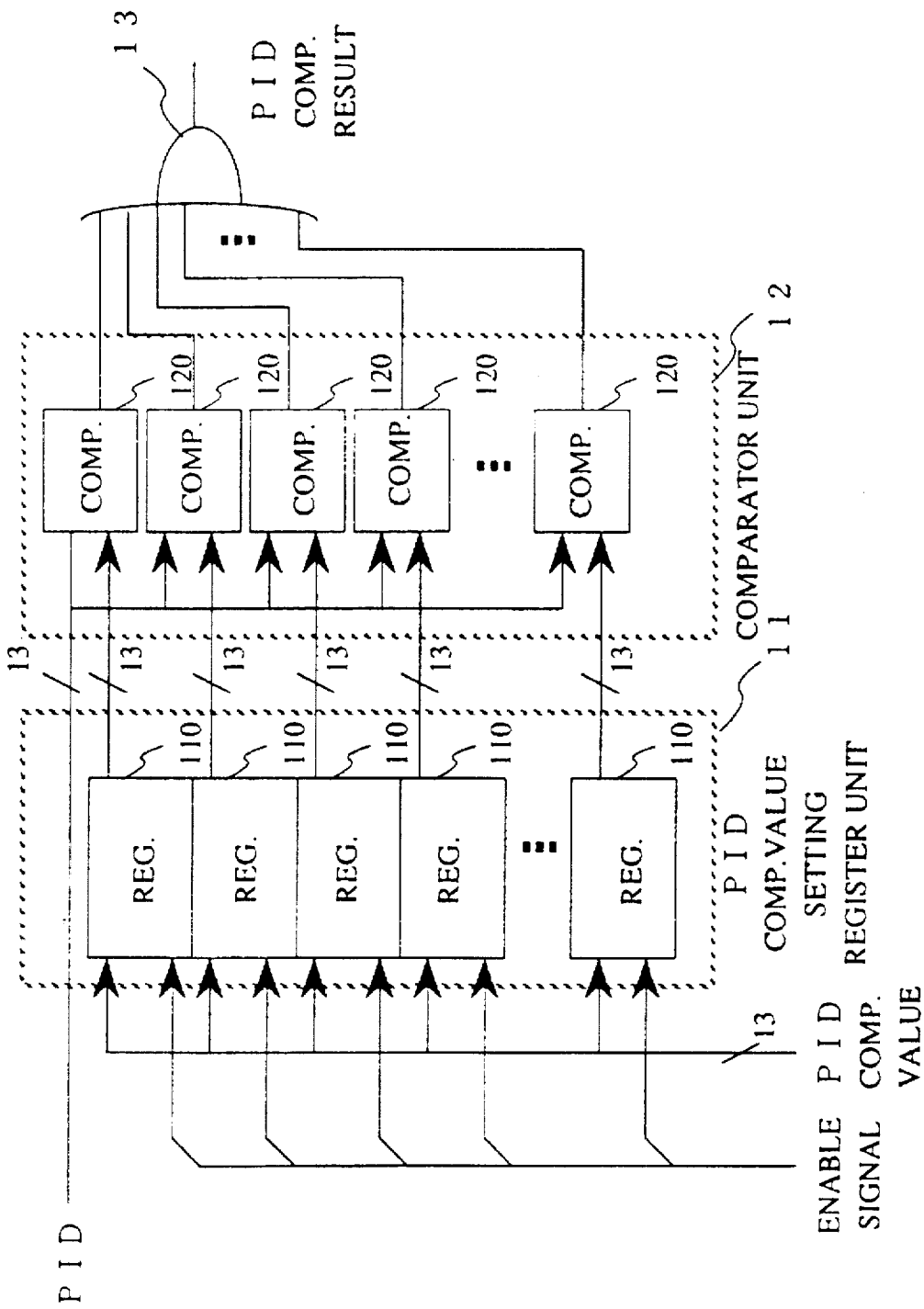
FIG. 9 is a diagram showing a configuration example of a PID comparator illustrated in FIG. 8.

FIG. 9 shows the configuration of the PID comparison unit 9 illustrated in FIG. 8. The PID comparison unit 9 is formed by a PID comparison value setting register unit 11 including a plurality of registers 110 and a comparator unit 12 including a plurality of comparators 120. In the registers 110, PID comparison values are set independently of each other. The PID comparison values are set by the CPU 6 via the data bus 16. On the basis of control data supplied together with the PID comparison value, a register enable signal is generated and thereby a register 110 storing the PID comparison value is selected. Although the kinds of the PID comparison value set in the PID comparison value setting register unit 11 differ depending upon the selected program, they are typically the video and audio PID values and the PID values of the PAT and PMT. Comparison of the PID detected from the packet with a plurality of PID comparison values are conducted in parallel. In FIG. 9, when the PID agrees with the PID comparison value, the output of the comparator 120 becomes "1." When the PID agrees with at least one comparison value included in a plurality of PID comparison values and the output of a logical OR 13 becomes "1", the packet is sent to the sequencer header/picture header detection unit 10 of the next stage. Packets yielding 0 as the output of the logical OR 13, i.e., packets which do not coincide with any comparison value are discarded at this time as unnecessary packets.

In the initial state immediately after power ON or in the case where programs were switched over by alteration of the desired program, the PAT packet is first needed and consequently 0 which is the PID value of the PAT (0000000000000 in the binary notation) is automatically set. This can be implemented by effecting control so as to reset all registers in the PID comparison value setting register unit the moment the power has turned on, for example. Since the PID of the PAT is fixed, the PID comparison value supplied to comparators may be fixed to 0 instead of actually using a register as PID comparison of the PAT.

By using, in the PID comparison unit 9 of FIG. 9, outputs of the comparators 120 connected to the registers 110 storing the video PID comparison values as control signals of the sequence header/picture header detection unit 10, it is also possible to effect control so as to conduct the processing of searching only video packets for a sequence header and a picture header.

Since in the present embodiment PID comparison operations can be conducted in parallel in the PID comparison unit 9, desired packets can be obtained efficiently.

Figure 10:
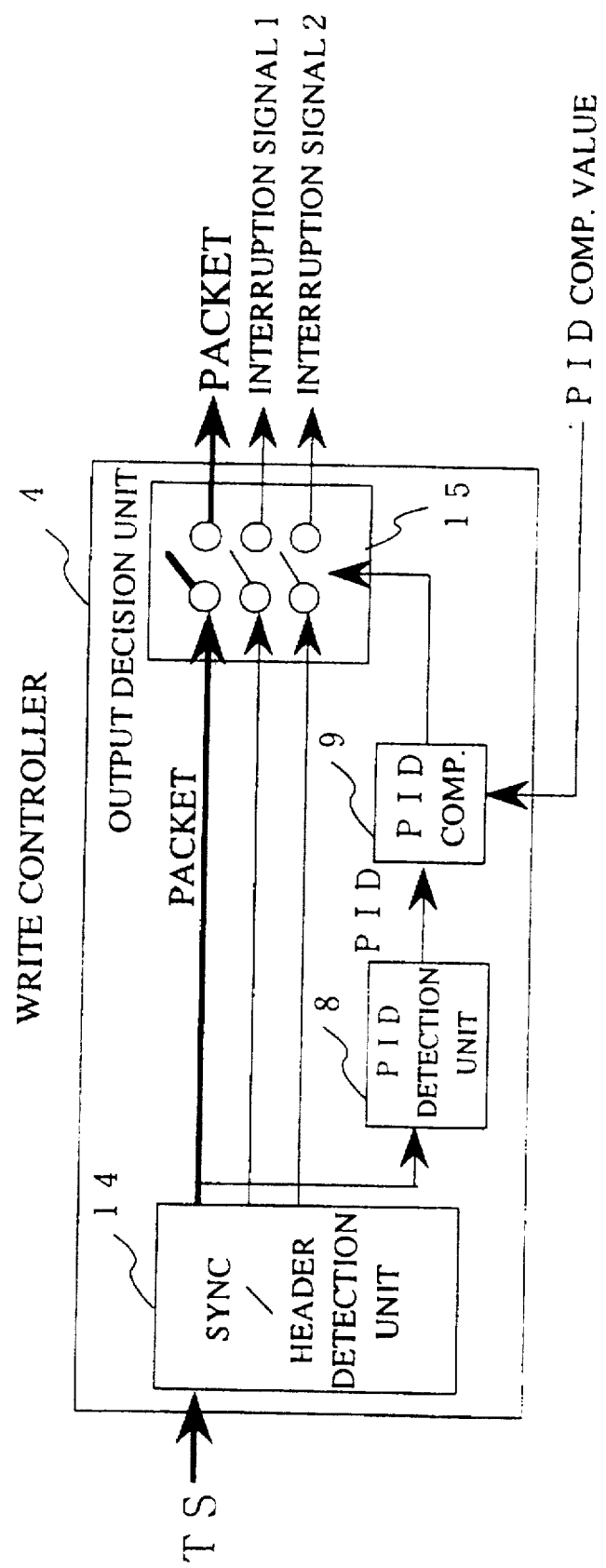
FIG. 10 is a diagram showing another configuration example of the write controller 4 in an embodiment of the present invention.
Figure 11:
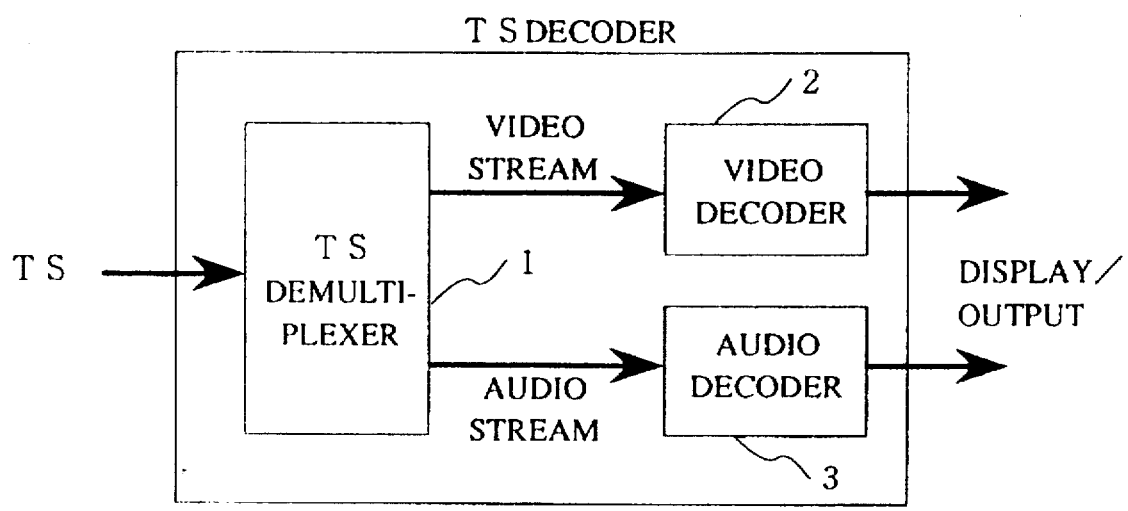
FIG. 11 is a diagram showing the configuration of a typical multiplexed stream demultiplexer.

Another embodiment of the present invention will now be described by referring to FIG. 10. This embodiment shows a different configuration example of the write controller 4 illustrated in FIG. 8. The write controller 4 of the present embodiment is obtained by putting together the function of the synchronization detection unit 7 and the function of the sequence header/picture header detection unit 10 illustrated in FIG. 8 into one circuit and forming the circuit as a synchronization/header detection unit 14. Hereafter, operation of the write controller 4 will be described.

If the transport stream TS is supplied as the input, a sequence header code and a picture start code included in the stream as well as a synchronization pattern are first detected in the synchronization/header detection unit 14. Packet data with packet top aligned are sent to an output decision unit 15. The output decision unit 15 effects control so as to selectively output a packet selected by the PID comparison unit 9 from the write controller 4. In addition, the output decision unit 15 selectively outputs additional information generated for the packet by the synchronization/header detection unit 14 to the CPU as the interruption signal 1 and the interruption signal 2.

In the present embodiment, the circuit can be made common to detection of the synchronization pattern and detection of the sequence header code and the picture start code. Therefore, a write controller having a smaller circuit scale than the embodiments shown in FIGS. 6, 7 and 8 can be implemented.

In the present embodiment, only the packets selected by the write controller are processed by the CPU. Therefore, the amount of processing in the CPU can be reduced as compared with the case where all packets of the multiplexed stream are processed by the CPU. In addition, the number of packets to be searched for a specific pattern can be minimized by using the additional information. Therefore, the amount of processing in the CPU can be further reduced. As a result, demultiplexing processing can be conducted correctly even in the case where the bit rate of the multiplexed stream is high and the header is complicated.

Furthermore, since the write controller is formed by only a circuit executing processing suitable for hardware such as detection of a specific bit pattern, the write controller can be implemented with a comparatively small circuit scale. Therefore, a multiplexed stream demultiplexer with the memory excluded can be implemented with a lower cost than the case where it is implemented by using hardware alone or the CPU alone. This effect is especially large in the case of application to a multiplexed stream demultiplexer having a high bit rate and a complicated header structure as in the transport stream TS of MPEG 2.

While embodiments of the present invention have heretofore been described by taking a TS demultiplexer as an example of the multiplexed stream demultiplexer, these embodiments can be applied in the same way to an apparatus for demultiplexing a multiplexed stream containing packets in which a plurality of data of different kinds such as video data and audio data are housed.

According to the present invention, it is possible to provide a data demultiplexer capable of lightening the processing of the analyzing processing unit.

According to the present invention, it is possible to provide a low-cost data demultiplexer capable of executing correctly demultiplexing processing even when demultiplexing a multiplexed stream having a high bit rate and a complicated header structure.

What is claimed is:

1. A data demultiplexer for demultiplexing an input stream formed by multiplexing a plurality of data and outputting desired data, said data demultiplexer comprising:

a memory for storing data of said input stream in a plurality of store areas;

a write controller for receiving the data of said input stream and writing data of a packet unit derived from said data into one store area included in said plurality of store areas of said memory;

an analyzing processing unit for reading out said data of the packet unit from said memory, analyzing a kind of said data read out, and generating analyzed information; and a plurality of transfer control units responsive to said analyzed information supplied from said analyzing processing unit to transfer the data read out from said memory to outputs thereof, wherein when writing data of a plurality of packet units successively from said write controller into said memory, write address information pieces respectively of said data of a plurality of packet units are successively stored in a FIFO memory, wherein said analyzing processing unit reads out data of packet units successively from said memory in accordance with said write address information pieces successively read out from said FIFO memory, and generates successively analyzed information pieces by analyzing kinds of the data, and wherein one of said plurality of transfer control units selectively responds to said analyzed information supplied from said analyzing processing unit, to transfer data read out from one store area of said memory to output thereof.

2. A data demultiplexer according to claim 1, wherein said memory, said analyzing processing unit, and said plurality of transfer control units are connected to each other via a bus, wherein said analyzing processing unit comprises a CPU, and wherein said FIFO memory comprises hardware contained within said CPU of said analyzing processing unit.

3. A data demultiplexer according to claim 1, wherein said memory, said analyzing processing unit, and said plurality of transfer control units are connected to each other via a bus, wherein said analyzing processing unit comprises a CPU, and wherein said FIFO memory comprises software for controlling operation of said CPU of said analyzing processing unit.

4. A data demultiplexer according to claim 1, 2 or 3, wherein one of said plurality of transfer control units selectively responds to said analyzed information supplied from said analyzing processing unit as a transfer request interruption signal, to read out data from one store area of said memory and transfer said data read out to output thereof.

5. A data demultiplexer according to claim 1, wherein said input stream comprises data obtained by multiplexing at least two kinds of data including video data and audio data, wherein said plurality of transfer control units comprise at least two transfer control units including a video transfer control unit and an audio transfer control unit, wherein said analyzing processing unit reads out data of packet units successively from said memory in accordance with said write address information pieces successively read out from said FIFO memory, and generates successively analyzed information pieces by analyzing at least two kinds of the data including video data and audio data, wherein said video transfer control unit selectively responds to said analyzed information supplied from said analyzing processing unit comprising the kind of video data, to transfer data read out from one store area of said memory to output thereof, and wherein said audio transfer control unit selectively responds to said analyzed information supplied from said analyzing processing unit comprising the kind of audio data, to transfer data read out from one store area of said memory to output thereof.

6. A data demultiplexer according to claim 1, wherein said memory comprises a dual port memory having a write data terminal connected to said write controller and a read data terminal connected to said plurality of transfer control units.

7. A data demultiplexer for demultiplexing an input stream formed by multiplexing a plurality of data and outputting desired output data, said data demultiplexer comprising:

a memory for storing data of said input stream;

a write controller for receiving the data of said input stream and writing packet data obtained from said received data into said memory; and an analyzing processing unit for reading out said packet data from said memory and analyzing a kind of said packet data read out, wherein said write controller includes:

a synchronization detector for detecting a packet header having a predetermined synchronization pattern from the data of said input stream;

a packet selection unit for selecting packet data having packet identification information specified by said analyzing processing unit from the data of said input stream; and a packet detection store unit for finding the selected packet data selected by said packet selection unit to have a specific pattern for timing control processing of packet data forming said desired output data, storing said packet data in said memory, and outputting additional information of a result of said detection, wherein said analyzing processing unit comprises a CPU controlled in operation by software, wherein said CPU derives packet identification information of packet data forming said desired output data from said packet data read out from said memory and sets said packet identification information in said packet selection unit, and wherein said CPU starts and executes timing control processing of said packet data having said additional information in response to said additional information outputted from said packet detection store unit.

8. A data demultiplexer according to claim 7, wherein said input stream comprises data obtained by multiplexing at least two kinds of data including video data and audio data, and wherein said memory, said CPU, and said write controller are connected to each other via a bus.

9. A data demultiplexer according to claim 8, wherein said specific pattern comprises a video sequence header code, a video picture start code, and a synchronization pattern located at audio frame top contained in said input stream.

10. A data demultiplexer for demultiplexing an input stream formed by multiplexing a plurality of data and outputting desired output data, said data demultiplexer comprising:

a memory for storing data of said input stream;

a write controller for receiving the data of said input stream and writing packet data obtained from said received data into said memory; and an analyzing processing unit for reading out said packet data from said memory and analyzing a kind of said packet data read out;

wherein said write controller includes:

a selection unit for selecting packet data having packet identification information specified by said analyzing processing unit from the data of said input stream and storing said packet data in said memory;

a detector for detecting a packet header having a predetermined synchronization pattern from the data of said input stream, finding the selected packet data selected by said selection unit to have a specific pattern for timing control processing of packet data forming said desired output data, and outputting additional information of a result of said detection, wherein said analyzing processing unit comprises a CPU controlled in operation by software, wherein said CPU derives packet identification information of packet data forming said desired output data from said packet data read out from said memory and sets said packet identification information in said selection unit, and wherein said CPU starts and executes timing control processing of said packet data having said additional information in response to said additional information outputted from said detector.

11. A data demultiplexer according to claim 10, wherein said input stream comprises data obtained by multiplexing at least two kinds of data including video data and audio data, and wherein said memory, said CPU, and said write controller are connected to each other via a bus.

12. A data demultiplexer according to claim 11, wherein said specific pattern comprises a video sequence header code, a video picture start code, and a synchronization pattern located at audio frame top contained in said input stream.

* * * * *